United States Patent
Ren et al.

(10) Patent No.: US 10,707,789 B2
(45) Date of Patent: Jul. 7, 2020

(54) ADAPTIVE CURRENT DAMPING MODULE FOR IMPROVED POWER CONVERTER CONTROL IN WIND TURBINE SYSTEMS

(71) Applicant: General Electric Company, Schenectady, NY (US)

(72) Inventors: Wei Ren, Niskayuna, NY (US); Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 15/594,079

(22) Filed: May 12, 2017

(65) Prior Publication Data

US 2018/0328342 A1 Nov. 15, 2018

(51) Int. Cl.
G05B 19/042 (2006.01)
H02P 9/00 (2006.01)
F03D 7/02 (2006.01)

(52) U.S. Cl.
CPC .......... *H02P 9/007* (2013.01); *F03D 7/0272* (2013.01); *G05B 19/042* (2013.01); *F05B 2270/337* (2013.01); *G05B 2219/2619* (2013.01)

(58) Field of Classification Search
CPC . G05B 2219/261; G05B 19/042; H02P 9/007; F03D 7/0272; F05B 2270/337; H02M 5/40; H02M 5/42; H02M 5/44; H02M 5/443; H02M 5/45; H02M 5/4505; H02M 5/451; H02M 5/452; H02M 5/458; H02M 5/4585

See application file for complete search history.

(56) References Cited

U.S. PATENT DOCUMENTS

| 5,225,712 A | 7/1993 | Erdman |
| 5,559,419 A | 9/1996 | Jansen et al. |
| 7,330,010 B2 | 2/2008 | Schroderus et al. |

(Continued)

FOREIGN PATENT DOCUMENTS

| CN | 1992496 A | 7/2007 |
| CN | 100486093 C | 5/2009 |

(Continued)

OTHER PUBLICATIONS

Larsen, Wind Generators and Series-Compensated AC Transmission Lines, IEEE PES General Meeting, Jul. 2012, pp. 1-4.

(Continued)

*Primary Examiner* — Bryan R Perez
(74) *Attorney, Agent, or Firm* — Dority & Manning, P.A.

(57) ABSTRACT

Systems and methods for controlling a power converter in a wind turbine system are provided. The wind turbine system can include a generator and a power converter. The power converter can include a plurality of switching devices and a current damping module. A method can include determining, by a control device, a flux magnitude of an air-gap between a rotor and a stator in the generator. The method can further include determining, by the control device, an orientation adjustment reference signal for the current damping module based at least in part on the flux magnitude. The method can further include controlling, by the control device, the power converter based at least in part on the orientation adjustment reference signal.

13 Claims, 8 Drawing Sheets

(56) References Cited

U.S. PATENT DOCUMENTS

| | | | |
|---|---|---|---|
| 8,310,074 B2 | 11/2012 | Larsen et al. | |
| 8,415,818 B2 | 4/2013 | Engelhardt et al. | |
| 8,693,220 B2 | 4/2014 | Klodowski et al. | |
| 8,829,828 B2 | 9/2014 | Godridge | |
| 9,455,633 B2 | 9/2016 | Olea et al. | |
| 2009/0021013 A1* | 1/2009 | Andresen | F03D 7/0272 290/44 |
| 2011/0101689 A1* | 5/2011 | Larsen | H02P 9/007 290/44 |
| 2011/0153092 A1 | 6/2011 | Engelhardt et al. | |
| 2011/0175354 A1* | 7/2011 | Bo | F03D 7/0272 290/44 |
| 2013/0010505 A1 | 1/2013 | Bo et al. | |
| 2013/0027994 A1 | 1/2013 | Nelson et al. | |
| 2013/0147442 A1 | 6/2013 | Tripathi et al. | |
| 2015/0056072 A1* | 2/2015 | Perley | F03D 7/0288 416/1 |
| 2016/0123305 A1 | 5/2016 | Deng | |

FOREIGN PATENT DOCUMENTS

| | | |
|---|---|---|
| CN | 100527595 C | 8/2009 |
| CN | 101141111 B | 7/2010 |
| CN | 102624321 A | 8/2012 |
| CN | 102195547 B | 9/2012 |
| CN | 202444460 U | 9/2012 |
| CN | 102148603 B | 6/2013 |
| CN | 103269201 A | 8/2013 |
| CN | 102570962 B | 3/2014 |
| CN | 102638058 B | 3/2014 |
| CN | 102570952 B | 4/2014 |
| CN | 103701388 A | 4/2014 |
| CN | 102705169 B | 5/2014 |
| CN | 103886791 A | 6/2014 |
| CN | 104218613 A | 12/2014 |
| CN | 104242598 A | 12/2014 |
| CN | 103269088 B | 2/2015 |
| CN | 104506106 A | 4/2015 |
| CN | 104579060 A | 4/2015 |
| CN | 104682809 A | 6/2015 |
| CN | 204498039 U | 7/2015 |
| CN | 104993762 A | 10/2015 |
| CN | 105071727 A | 11/2015 |
| CN | 105337312 A | 2/2016 |
| CN | 104253446 B | 3/2016 |
| CN | 104009495 B | 5/2016 |
| CN | 105896600 A | 8/2016 |
| CN | 104091501 B | 9/2016 |
| CN | 105958534 A | 9/2016 |
| EP | 3073631 A1 | 9/2016 |
| GB | 164743 A | 9/1922 |
| IN | 201000414 P2 | 7/2010 |
| JP | 2002191123 A | 7/2002 |
| JP | 3720357 B2 | 11/2005 |
| KR | 100691529 B1 | 3/2007 |
| KR | 20150138130 A | 12/2015 |
| WO | WO 96/18937 | 6/1996 |
| WO | 2017/000945 A1 | 1/2017 |
| WO | WO 2017/000945 A1 | 1/2017 |

OTHER PUBLICATIONS

International Search Report and Written Opinion issued in connection with corresponding PCT Application No. PCT/US2018/031322 dated Aug. 17, 2018.

* cited by examiner

ADAPTIVE CURRENT DAMPING MODULE FOR IMPROVED POWER CONVERTER CONTROL IN WIND TURBINE SYSTEMS

FIELD

The present disclosure relates generally to wind turbines, and more particularly to methods and systems for a current damping module for improved power converter control in wind turbines.

BACKGROUND

Generally, a wind turbine includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a tower.

Some wind turbine configurations include doubly-fed induction generators (DFIGs, also known as dual-fed asynchronous generators). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid. Alternatively, some wind turbine configurations include, without limitation, alternative types of induction generators, permanent magnet (PM) synchronous generators, electrically-excited synchronous generators, and switched reluctance generators. These alternative configurations may also include power converters that are used to convert the frequencies as described above and transmit electrical power between the utility grid and the generator.

At least some known electric utility grids include one or more series-compensated transmission lines. Such transmission lines often create subsynchronous resonance currents that may be lightly damped. When at least some known wind turbines are electrically coupled to such transmission lines, the wind turbines decrease the damping of the subsynchronous currents. As such, the subsynchronous currents may increase in amplitude and may cause a fault or "trip" to occur and render the wind turbine inoperable. Moreover, such subsynchronous currents may damage or otherwise shorten a lifespan of one or more components of the wind turbine and/or the electric utility grid.

BRIEF DESCRIPTION

Aspects and advantages of the invention will be set forth in part in the following description, or may be obvious from the description, or may be learned through practice of the invention.

One example aspect of the present disclosure is directed to a method for controlling a power converter in a wind turbine system. The wind turbine system can include a generator and a power converter. The power converter can include a plurality of switching devices and a current damping module. The method can include determining a flux magnitude of an air-gap between a rotor and a stator in the generator. The method can further include determining an orientation adjustment reference signal for the current damping module based at least in part on the flux magnitude. The method can further include controlling the power converter based at least in part on the orientation adjustment reference signal.

Another example aspect of the present disclosure is directed to a control system for a wind turbine system. The wind turbine system can include a generator and a power converter. The power converter can include a plurality of switching devices and a current damping module. The control system can include one or more processors and one or more memory devices configured to store instructions that when executed by the one or more processors cause the one or more processors to perform operations. The operations can include determining a flux magnitude of an air-gap between a rotor and a stator in the generator. The operations can further include determining an orientation adjustment reference signal for the current damping module based at least in part on the flux magnitude. The operations can further include controlling the power converter based at least in part on the orientation adjustment reference signal such that the wind turbine system can exhibit a positive damping characteristic for a subsynchronous frequency range.

Yet another example aspect of the present disclosure is directed to a doubly fed induction generator (DFIG) wind turbine system. The DFIG wind turbine system can include a DFIG generator. The DFIG generator can include a rotor and a stator. The DFIG wind turbine system can further include a power converter. The power converter can include a plurality of switching devices and a current damping module. The DFIG wind turbine system can further include a control system. The control system can include one or more processors and one or more memory devices configured to store instructions that when executed by the one or more processors cause the one or more processors to perform operations. The operations can include determining, by a control device, a flux magnitude of an air-gap between a rotor and a stator in the generator. The operations can further include determining an orientation adjustment reference signal for the current damping module based at least in part on the flux magnitude. The operations can further include controlling the power converter based at least in part on the orientation adjustment reference signal. As a result of controlling the power converter, the wind turbine system can exhibit a positive damping characteristic for a subsynchronous frequency range.

Variations and modifications can be made to these example embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, example aspects of the present disclosure are directed to wind turbine systems and control methods for a power converter in a wind turbine system. More particularly, a wind turbine system can include a generator and a power converter. The power converter can include a plurality of switching devices and a current damping module. A method for controlling the power converter can allow a wind turbine system to exhibit a positive damping characteristic for a subsynchronous frequency range.

Subsynchronous control interaction (SSCI) stability is an important characteristic that certain windfarms may need to demonstrate before they can be interconnected to a grid, particularly where series compensated transmission lines are present. Wind turbines, such as doubly fed induction generators (DFIGs), can demonstrate SSCI instability when the DFIG exhibits negative resistance in a subsynchronous frequency range. For example, a DFIG wind turbine system can be interconnected to an electric power transmission and distribution grid, and a subsynchronous frequency range can be a frequency range that is less than a frequency of the electric power transmission and distribution grid (e.g., 50/60 Hz). During operation of the DFIG, the rotor can exhibit a varied resistance as the terminal voltage of the wind turbine generator varies. For example, the rotor resistance can become negative when the rotor speed is slightly higher than the subsynchronous frequency, and the slip frequency becomes negative. In such a situation, the negative resistance of the rotor can amplify rather than dampen an instability in the subsynchronous frequency range. Due to a saturation effect, the equivalent magnetizing reactance of a generator can change as the air-gap flux varies. When this magnetizing reactance changes, the total frequency resistance of the wind turbine generator (from a stator side perspective) can also change.

According to example aspects of the present disclosure, a power converter can be controlled such that the wind turbine system exhibits a positive damping characteristic for a subsynchronous frequency range. As used herein, the term "positive damping characteristic" refers to subsynchronous control interaction wherein a wind turbine generator is stable for a subsynchronous frequency range. For example, a SSCI stable control should render a positive frequency resistance (i.e., positive damping) in the subsynchronous frequency range under all operating conditions.

A method for controlling a power converter can include determining a flux magnitude of an air-gap between a rotor and a stator in the generator. For example, a flux magnitude can be estimated by a flux magnitude estimator. In an embodiment, the flux magnitude estimator can estimate the flux magnitude based on a voltage of the stator.

The method can further include determining an orientation adjustment reference signal for the current damping module based at least in part on the flux magnitude. For example, the flux magnitude estimator can provide an estimated flux magnitude to an adaptive orientation angle adjustment logic. The adaptive orientation angle adjustment logic can determine an orientation adjustment reference signal based at least in part on the flux magnitude. In an embodiment, the orientation adjustment reference signal can be determined from a lookup table, such as by looking up a corresponding orientation adjustment reference signal for a particular flux magnitude. In another embodiment, the orientation adjustment reference signal can be determined by an equation, such as an equation wherein the orientation adjustment reference signal is the minimum of a first threshold or a second threshold, wherein the second threshold is determined based on the flux magnitude.

The method can further include controlling the power converter based at least in part on the orientation adjustment reference signal. For example, the switching behavior of the plurality of switching devices in the power converter can be controlled based at least in part on the orientation adjustment reference signal. For example, a duty cycle of the plurality of switching devices can be controlled, such as by controlling a switching signal for the plurality of switching devices.

In this way, the systems and methods according to example aspects of the present disclosure can have a technical effect of providing SSCI stability for a wind turbine system for a subsynchronous frequency range under operating conditions which would have been unstable under previous control schemes. In particular, the systems and methods according to example aspects of the present disclosure can allow for a positive frequency resistance in a subsynchronous frequency range by controlling the power converter in a wind turbine system. This can allow for a significant cost savings as it can allow for reducing or eliminating SSCI instability without the need to install a hardware damping circuit.

Figure 1:
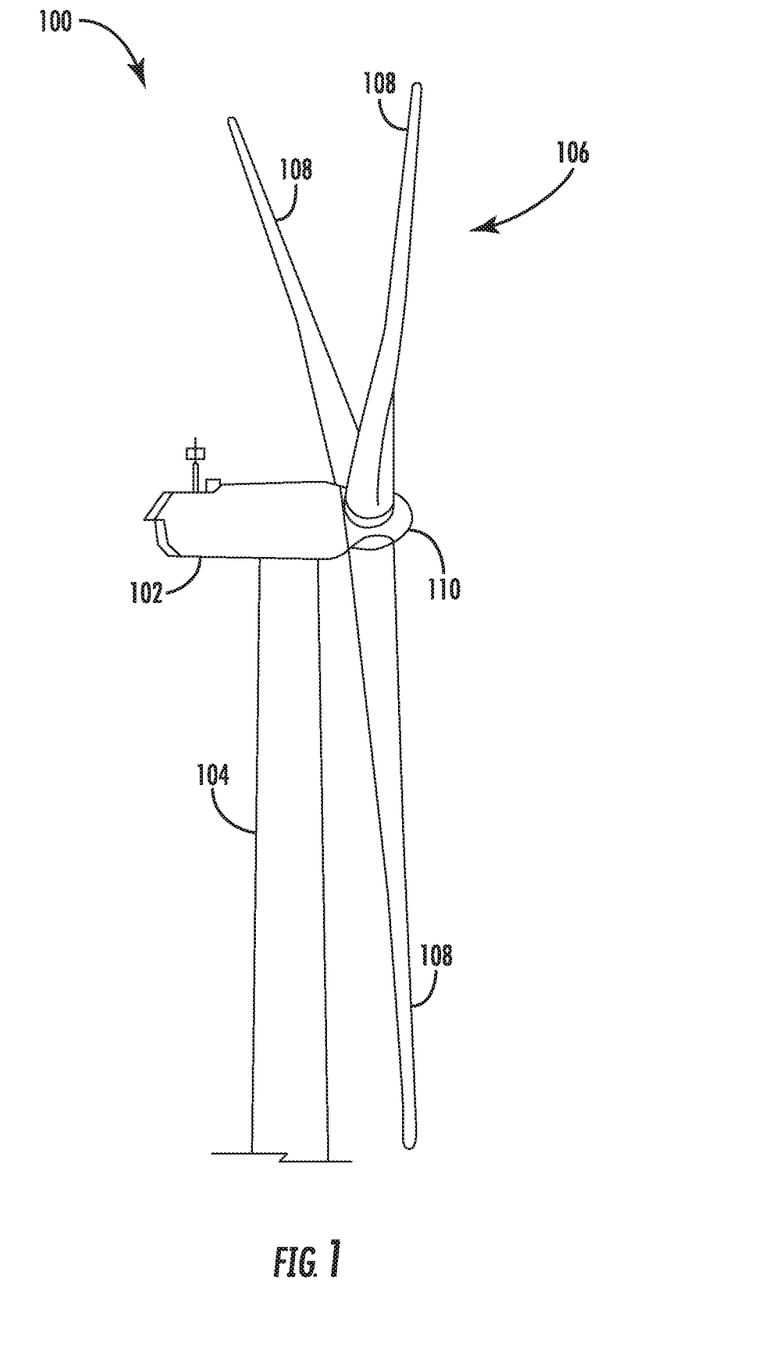
FIG. 1 depicts a perspective view of a portion of a wind turbine according to example aspects of the present disclosure.

With reference now to the FIGS., example embodiments of the present disclosure will now be discussed in detail. FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitate operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
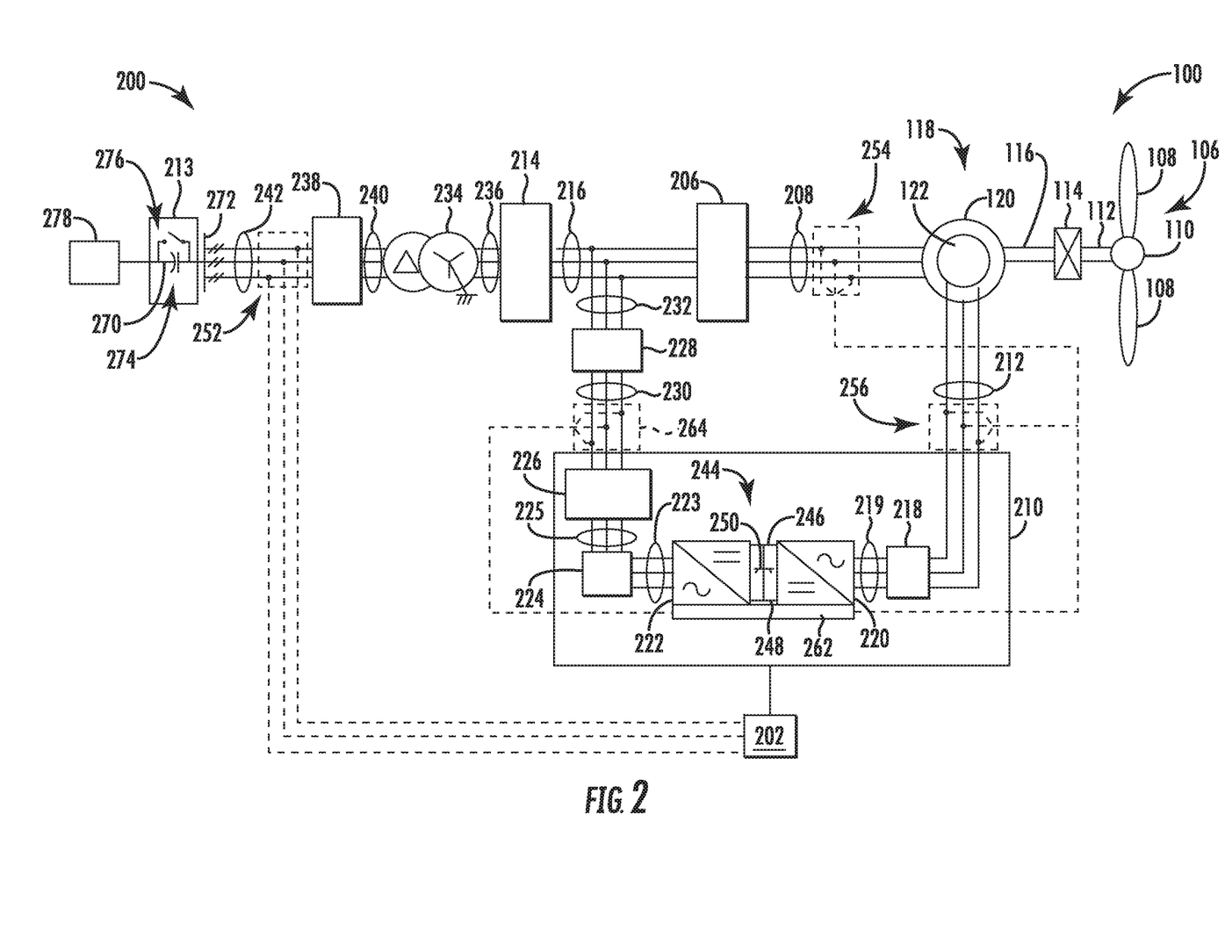
FIG. 2 depicts a schematic view of an electrical and control system that may be used a wind turbine according to example aspects of the present disclosure.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In an exemplary embodiment, generator 118 is a wound rotor, multiphase (e.g., three-phase), double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

One or more processors for turbine controller 202 can process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) known in the art, wherein a full power conversion assembly (not shown in FIG. 2), that is similar in design and operation to power conversion assembly 210, is electrically coupled to generator stator 120, and such full power conversion assembly facilitates channeling electric power between generator stator 120 and an electric power transmission and distribution grid 213. In an exemplary embodiment, stator bus 208 transmits multiphase (e.g., three-phase) power from generator stator 120 to stator synchronizing switch 206. Rotor bus 212 transmits multiphase (e.g., three-phase) power from generator rotor 122 to power conversion assembly 210. In an exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 are used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In an exemplary embodiment, rotor-side power converter 220 and line-side power converter 222 are configured in a multiphase (e.g., three-phase), pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In an exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 wherein any protection scheme (not shown) is configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to electric power transmission and distribution grid 213 via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to electric power transmission and distribution grid 213 via breaker-side bus 240 and grid bus 242.

In an exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252, including, but not limited to, one voltage and electric current measurement signal from one transducer.

As shown in FIG. 2, electrical and control system 200 also includes a converter controller 262 that is configured to receive a plurality of voltage and electric current measurement signals from a second set of voltage and electric current sensors 254 coupled in electronic data communication with stator bus 208, a third set of voltage and electric current measurement signals from a third set of voltage and electric current sensors 256 coupled in electronic data communication with rotor bus 212, and a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electric data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

In the exemplary embodiment, electric power transmission and distribution grid 213 includes one or more transmission lines 270 (only one shown for clarity) that are coupled to grid bus 242 via a grid coupling 272. Transmission lines 270 and/or electric power transmission and distribution grid 213 include one or more series compensation elements 274, such as one or more capacitors, to facilitate reducing reactive power losses within transmission lines 270. As described herein, series compensation elements 274 may create one or more subsynchronous resonances within electric power transmission and distribution grid 213. Transmission lines 270 and/or electric power transmission and distribution grid 213 also include one or more switches 276 coupled to each series compensation element 274. Switches 276 couple and decouple series compensation elements 274 to and from electric power transmission and distribution grid 213, respectively, as desired. More specifically, switches 276 are opened to couple series compensation elements 274 to electric power transmission and distribution grid 213, and switches 276 are closed to decouple series compensation elements 274 from electric power transmission and distribution grid 213. Electric power transmission and distribution grid 213 is operatively coupled to one or more loads 278 for providing power to loads 278.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, multiphase (e.g., three-phase) alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to electric power transmission and distribution grid 213 via breaker-side bus 240, grid circuit breaker 238 and grid bus 242.

In an exemplary embodiment, a second electrical power transmission path is provided. Electrical, multiphase (e.g., three-phase), sinusoidal, AC power is generated within generator rotor 122 and is transmitted to power conversion assembly 210 via rotor bus 212. Within power conversion assembly 210, the electrical power is transmitted to rotor filter 218 wherein the electrical power is modified for the rate of change of the output voltage associated with rotor-side power converter 220. Rotor-side power converter 220 acts as a rectifier and rectifies the sinusoidal, multiphase (e.g., three-phase) AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 wherein line-side power converter 222 acts as an inverter configured to convert the DC electrical power from DC link 244 to multiphase (e.g., three-phase), sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the multiphase (e.g., three-phase) power from generator stator 120 with the multiphase (e.g., three-phase) power from power conversion assembly 210.

Conversion circuit breaker 228, main transformer circuit breaker 214, and grid circuit breaker 238 are configured to disconnect corresponding buses, for example, when current flow is excessive and can damage the components of electrical and control system 200. Additional protection components are also provided, including line contactor 226, which may be controlled to form a disconnect by opening a switch (not shown in FIG. 2) corresponding to each of the lines of line bus 225.

Power conversion assembly 210 compensates or adjusts the frequency of the multiphase (e.g., three-phase) power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, multiphase (e.g., three-phase) AC power to DC power. The DC power is transmitted into DC link 244. Capacitor 250 facilitates mitigating DC link 244 voltage amplitude variations by facilitating mitigation of a DC ripple sometimes associated with multiphase (e.g., three-phase) AC rectification.

The DC power is subsequently transmitted from DC link 244 to rotor-side power converter 220 wherein rotor-side power converter 220 acts as an inverter configured to convert the DC electrical power transmitted from DC link 244 to a multiphase (e.g., three-phase), sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub synchronous operation.

Power conversion assembly 210 is configured to receive control signals from turbine controller 202. The control signals are based on sensed conditions or operating characteristics of wind turbine 100 and electrical and control system 200, received by turbine controller 202 and used to control operation of power conversion assembly 210. Feedback from sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the switching devices (e.g., IGBTs) from conducting within line-side power converter 222. Such suspension of operation of line-side power converter 222 will substantially mitigate electric power being channeled through power conversion assembly 210 to approximately zero.

Figure 3:
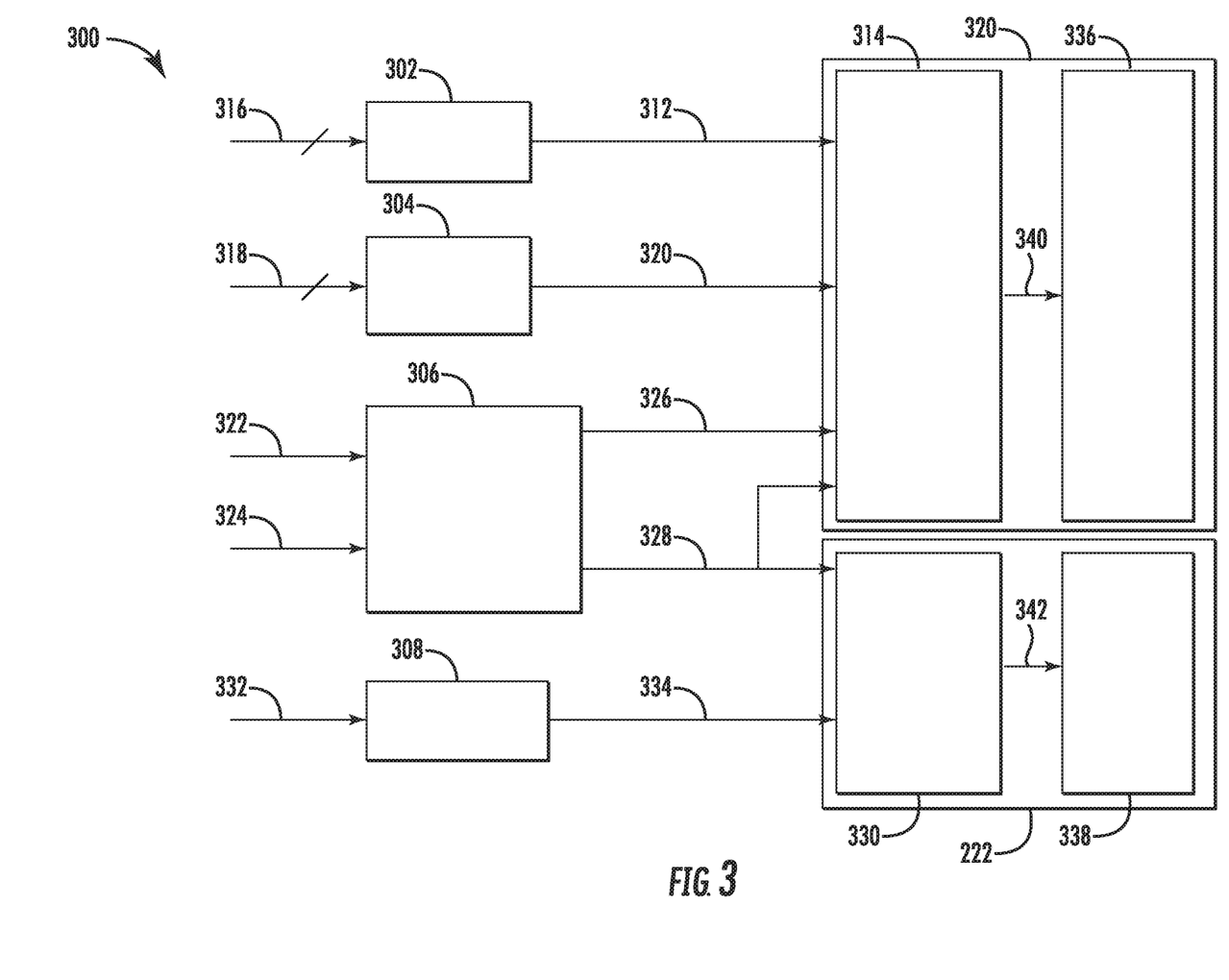
FIG. 3 depicts a block diagram of a power converter system that may be used with a wind turbine system according to example aspects of the present disclosure.

FIG. 3 shows an exemplary power converter system 300 that may be used with electrical and control system 200 (shown in FIG. 2). In an exemplary embodiment, power converter system 300 includes rotor-side power converter 220 and line-side power converter 222. Power converter system 300 also includes a torque regulator 302, a reactive power regulator 304, a synchronizing phase-locked loop (PLL) 306, and a DC voltage regulator 308.

Torque regulator 302 transmits a first rotor current command signal 312 to rotor-side power converter 220, and more specifically, to a rotor converter control module 314. First rotor current command signal 312 is used to adjust a rotor current based on a desired generator torque command signal 316 received from turbine controller 202 (shown in FIG. 2). Reactive power regulator 304 receives a stator voltage and reactive power command signal 318 from turbine controller 202 and transmits a second rotor current command signal 320 to rotor converter control module 314. Second rotor current command signal 320 is used to control a power factor of generator 118 (shown in FIG. 2) by adjusting a ratio of real power to reactive power of generator 118. In an exemplary embodiment, torque regulator 302 and reactive power regulator 304 are housed within converter controller 262 (shown in FIG. 2). In an alternative embodiment, torque regulator 302 and/or reactive power regulator 304 may be housed within another suitable controller, such as turbine controller 202. Any of the regulators and/or modules described herein can be computer logic or computer-readable instructions that are implemented by one or more processing devices.

Synchronizing PLL 306 receives a rotor position feedback signal 322 from a rotor position sensor (not shown) and a stator voltage feedback signal 324 from second set of voltage and electric current sensors 254 (shown in FIG. 2). Synchronizing PLL 306 determines a transformation angle signal 326 and a reference angle signal 328 that are used to transform rotor voltages and rotor currents between two or more signal reference frames, such as a time-based reference frame and a phasor-based reference frame. In one embodiment, transformation angle signal 326 and reference angle signal 328 are used to transform rotor voltages and rotor currents to one or more phasors that include X and Y components of the rotor voltages and/or rotor currents. As used herein, an X component refers to a real component of a phasor, and a Y component refers to an imaginary component of a phasor. Transformation angle signal 326 and reference angle signal 328 are transmitted to rotor converter control module 314 and to a line converter control module 330 that is positioned within line-side power converter 222.

DC voltage regulator 308 receives a DC voltage reference signal 332 that is set, for example, during wind turbine commissioning, and transmits a line current command signal 334 to line converter control module 330. Line current command signal 334 is used to adjust a DC voltage of DC link 244 (shown in FIG. 2).

Rotor converter control module 314 is coupled to a rotor converter switching array 336, and line converter control module 330 is coupled to a line converter switching array 338. In an exemplary embodiment, rotor converter switching array 336 and line converter switching array 338 each includes a plurality of switching devices, such as insulated-gate bipolar transistors ("IGBTs") (not shown). Alternatively, rotor converter switching array 336 and/or line converter switching array 338 include any suitable switching devices that enable rotor-side power converter 220 and line-side power converter 222 to operate as described herein (e.g., metal-oxide-semiconductor field-effect transistors ("MOSFETs")). In an exemplary embodiment, rotor converter control module 314 and line converter control module 330 use pulse-width modulation to control a duty cycle of a rotor converter switch control signal 340 and of a line converter switch control signal 342, respectively. Rotor converter switch control signal 340 controls a switching behavior of rotor converter switching array 336, and line converter switch control signal 342 controls a switching behavior of line converter switching array 338. As such, rotor converter switching array 336 and line converter switching array 338 are controlled to produce one or more desired rotor and/or stator voltage and/or current characteristics.

Although not shown in FIG. 3, one or more control components of power converter system 300 receive one or more feedback signals to facilitate maintaining proper operation of power converter system 300. Such feedback signals include, without limitation, a DC voltage signal, a multiphase (e.g., three-phase) rotor current signal (such as from third set of voltage and electric current sensors 256), a multiphase (e.g., three-phase) current signal (such as from second set of voltage and electric current sensors 254), a multiphase (e.g., three-phase) line current signal (such as from fourth set of voltage and electric current sensors 264), a multiphase (e.g., three-phase) stator voltage signal (such as from second set of voltage and electric current sensors 254), and/or a rotor position signal.

Figure 4:
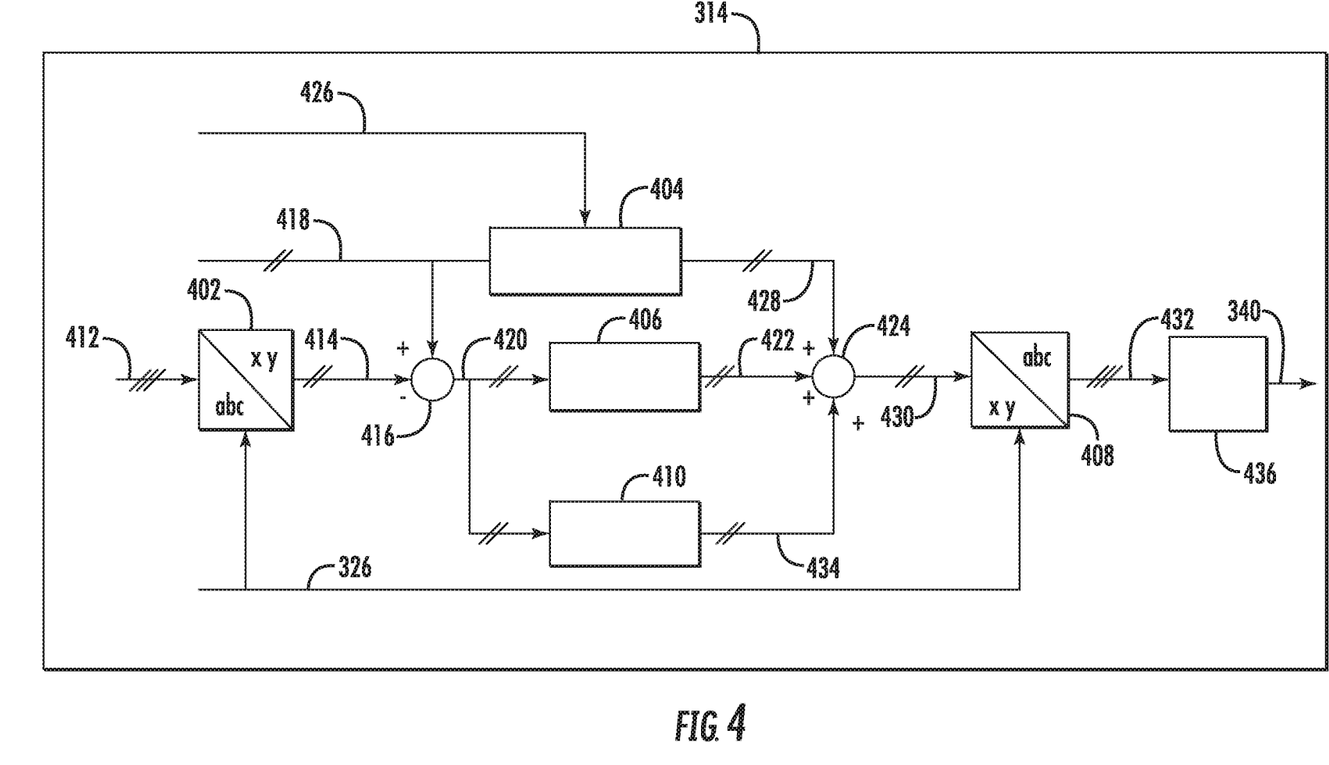
FIG. 4 depicts a block diagram of a rotor converter control module that may be used with a wind turbine system according to example aspects of the present disclosure.

FIG. 4 schematically shows rotor converter control module 314 that may be used with power converter system 300 (shown in FIG. 3). In an exemplary embodiment, rotor converter control module 314 includes a current transform module 402, an impedance feedforward module 404, a regulator module 406, a voltage transform module 408, and a current damping module 410.

Current transform module 402 receives a current feedback signal 412 that includes current measurements from third set of electric current sensors 256 (shown in FIG. 2) of each phase of rotor bus 212 (shown in FIG. 2). In an exemplary embodiment, current feedback signal 412 includes one or more current components from electric power transmission and distribution grid 213 via power converter system 300 and/or via generator 118 (shown in FIG. 2). In one embodiment, one or more current components may include, for example, one or more subsynchronous current frequency components and/or one or more grid frequency components that substantially conforms to a frequency of electric power transmission and distribution grid 213. Current transform module 402 receives transformation angle signal 326 and transforms the multiphase (e.g., three-phase) instantaneous currents of current feedback signal 412 into a phasor-based reference frame. Current transform module 402 transmits a current feedback phasor 414 to a current feedback comparator 416. Current feedback comparator 416 receives a current command phasor 418, which includes first rotor current command signal 312 and second rotor current command signal 320 (both shown in FIG. 2), and calculates a difference between current feedback phasor 414 and current command phasor 418. Current feedback comparator 416 transmits the resulting difference as a current error phasor 420 to regulator module 406 and to current damping module 410.

Regulator module 406 receives current error phasor 420 and performs proportional plus integral feedback regulation to adjust an output of regulator module 406 to facilitate reducing an error of current error phasor 420 to substantially 0. Regulator module 406 transmits a resulting regulator output phasor 422, which is a voltage phasor signal, to a regulator adder 424.

Impedance feedforward module 404 receives current command phasor 418 and a slip frequency signal 426. Impedance feedforward module 404 computes an amplitude of a feedforward command phasor 428 as a feedforward voltage phasor signal to supplement a closed-loop current regulation of regulator module 406.

In the exemplary embodiment, current damping module 410 receives current error phasor 420 and facilitates reducing an amplitude of one or more current frequency components represented by current error phasor 420. In an exemplary embodiment, the one or more current frequency components are subsynchronous to a current frequency of electric power transmission and distribution grid 213 (shown in FIG. 2). As used herein, the term "subsynchronous" refers to a frequency that is less than a reference frequency, and in certain embodiments, a frequency that is less than the frequency of electric power transmission and distribution grid 213. Current damping module 410 transmits a resulting damping control phasor 434, which is a voltage phasor signal, to regulator adder 424.

Regulator adder 424 combines regulator output phasor 422, feedforward command phasor 428, and damping control phasor 434, and transmits a resulting voltage command phasor 430 to voltage transform module 408. Voltage transform module 408 transforms voltage command phasor 430 to a time-based reference frame using transformation angle signal 326, and outputs a resulting three-phase sinusoidal voltage command signal 432. Voltage command signal 432 is modulated by a pulse-width modulation (PWM) module 436. PWM module 436 transmits rotor converter switch control signal 340 to rotor converter switching array 336 (shown in FIG. 2) to control a switching operation, such as a duty cycle, of the switching devices within rotor converter switching array 336.

Figure 5:
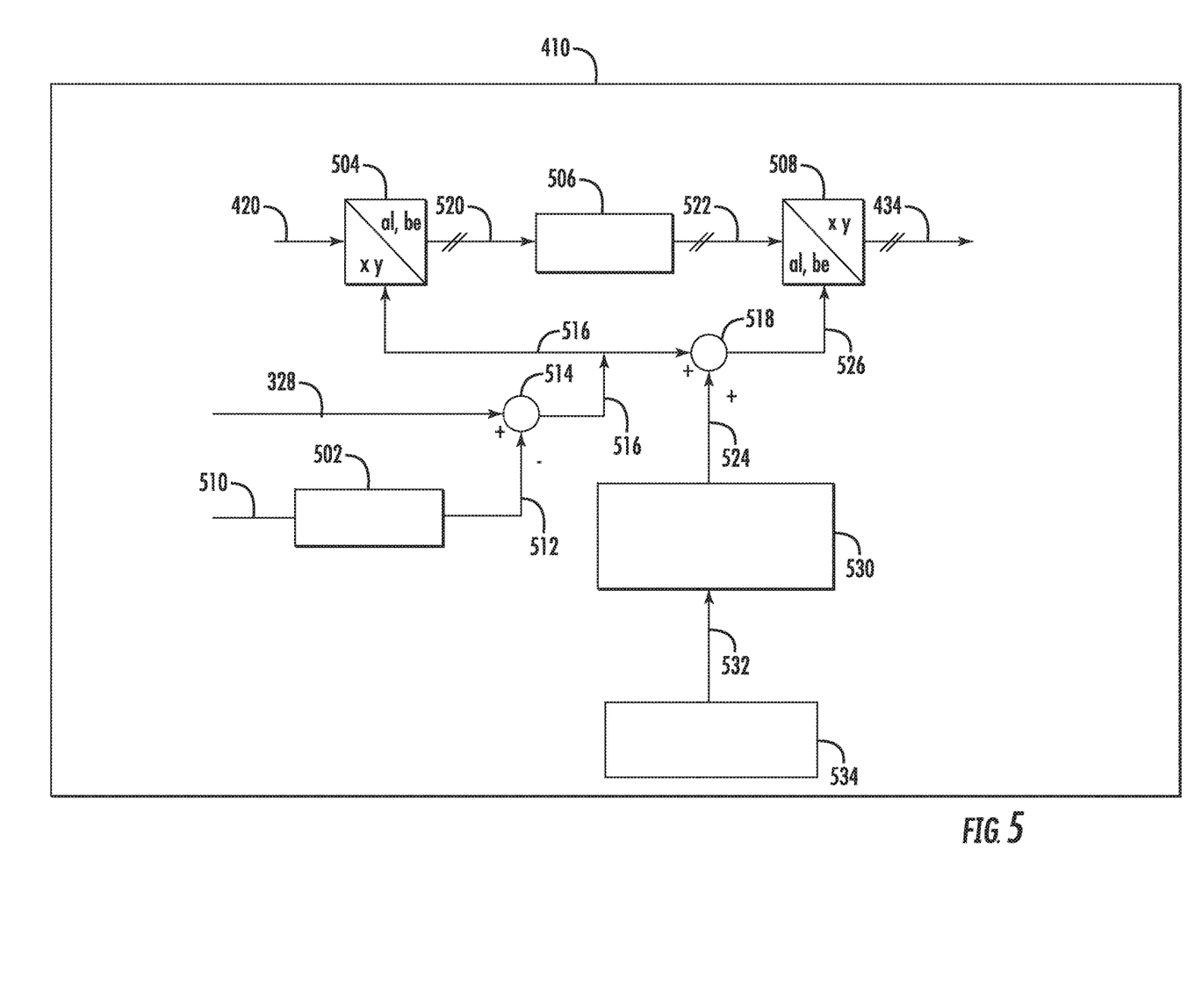
FIG. 5 depicts a block diagram of a current damping module according to example aspects of the present disclosure.

FIG. 5 schematically shows a portion of current damping module 410 that may be used with rotor converter control module 314 (shown in FIG. 3). In the exemplary embodiment, current damping module 410 includes an integrator module 502, an input transform module 504, one or more subsynchronous damping control (SSDC) regulator modules 506, and an output transform module 508. Integrator module 502 receives a predetermined subsynchronous frequency signal 510 that, in one embodiment, represents one or more predetermined subsynchronous current frequencies to be damped. Subsynchronous frequency signal 510 is selected as a frequency of a reference frame upon which the sub synchronous frequency of the grid resonance is acted upon by SSDC regulator module 506. In one embodiment, the reference frame may have a substantially zero frequency, such that a frequency of one or more signals entering SSDC regulator module 506 will be equal to a frequency of signals seen from a stationary reference frame. In another embodiment, the reference frame may be selected to rotate near an anticipated frequency of the subsynchronous grid resonance. Selection of the appropriate sub synchronous frequency signal 510 is dependent upon the remainder of the system in which current damping module 410 is embedded, and is done during design studies for tuning the subsynchronous damping feature of the system.

Integrator module 502 integrates subsynchronous frequency signal 510 and transmits a resulting sub synchronous angle signal 512 to a reference angle comparator 514. Reference angle comparator 514 calculates a difference between sub synchronous angle signal 512 and reference angle signal 328, and outputs a resulting subsynchronous reference angle signal 516 to input transform module 504 and to a sub synchronous orientation adder 518.

Input transform module 504 receives current error phasor 420, and performs a transformation of current error phasor 420 using sub synchronous reference angle signal 516. More specifically, input transform module 504 transforms current error phasor 420 into a rotating reference frame that includes two components, α and β, using the following equations:

$$\alpha = x^* \cos\theta + y^* \sin\theta \qquad \text{(Eq. 1)}$$

$$\beta = x^* = \sin\theta + y^* \cos\theta \qquad \text{(Eq. 2)}$$

where x is a real component of current error phasor 420, γ is an imaginary component of current error phasor 420, and θ is subsynchronous reference angle signal 516. The rotating reference frame that includes α and β rotates substantially at the frequency of the subsynchronous current frequency. Input transform module 504 transmits a current error transform signal 520 that includes α and β to SSDC regulator module 506. Current error transform signal 520 includes a frequency component that is substantially equal to the subsynchronous current frequency. In an exemplary embodiment, SSDC regulator module 506 includes, and/or is configured to perform, a proportional-plus-integral transfer function. Alternatively, SSDC regulator module 506 includes any suitable transfer function or other algorithm that enables current damping module 410 to operate as described herein. SSDC regulator module 506 integrates and adds a gain to current error transform signal 520. SSDC regulator module 506 transmits a resulting current subsynchronous damping transform signal 522 to output transform module 508. Sub synchronous damping transform signal 522 includes a frequency component that is substantially equal to the subsynchronous current frequency.

Sub synchronous orientation adder 518 combines subsynchronous reference angle signal 516 with an orientation adjustment reference signal 524, and transmits a resulting output orientation signal 526 to output transform module 508. The orientation adjustment reference signal 524 can be determined by an adaptive orientation angle adjustment logic 530. For example, the orientation adjustment reference signal 524 can be determined by the orientation angle adjustment logic 530 based on a flux magnitude 532.

The flux magnitude 532 can be determined by a flux estimator 534. In various embodiments, the flux estimator 534 can be included in a current damping module 410, or can be a flux estimator 534 external to the current damping module. Flux estimator 534 can be a module configured to estimate an air-gap flux magnitude, as is known in the art. For example, a flux estimator 534 can be configured to estimate an air-gap flux based on the voltage of a stator. Additionally and/or alternatively, the flux magnitude 532 can be determined by any suitable method or device known in the art. In one or more embodiments, the flux estimator 534 can estimate the flux magnitude 534 in a per unit ("PU") value. For example, the air-gap flux between the rotor and the stator in a generator can become saturated, and when saturated can be a per unit value of 1.0.

The flux magnitude 532 can be used by the adaptive orientation angle adjustment logic 530 in order to adjust the orientation adjustment reference signal 524. For example, the adaptive orientation angle adjustment logic 530 can be configured to output the orientation adjustment reference signal 524 based at least in part on the flux magnitude 532, such as, for example, by receiving the flux magnitude 532 and using a look-up table in order to determine the corresponding orientation adjustment reference signal 524.

Figure 6:
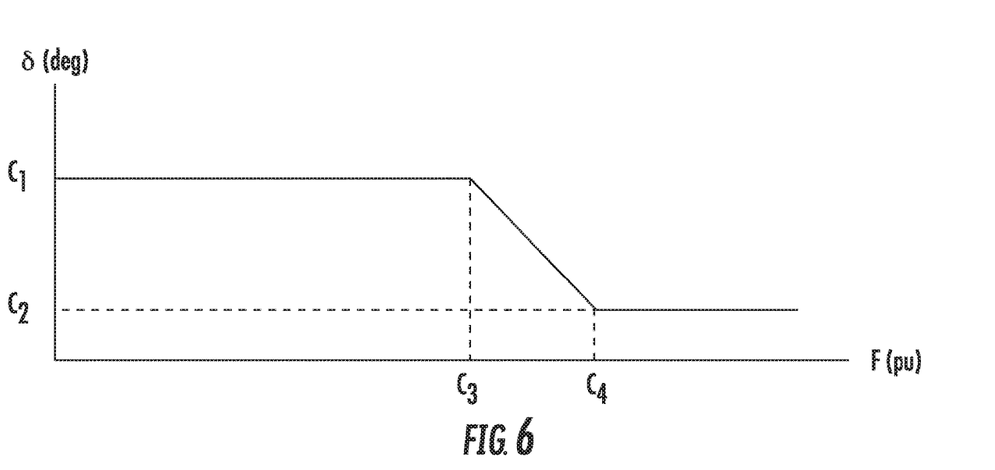
FIG. 6 depicts a graph of a relationship between a flux magnitude and an orientation adjustment reference signal according to example aspects of the present disclosure.

In another embodiment, the adaptive orientation angle adjustment logic 530 can be configured to determine the orientation adjustment reference signal 524 based on a formula. For example, the adaptive orientation angle adjustment logic 530 can determine the orientation adjustment reference signal 524 based on the following equation:

$$\delta = \min(C_1, \max(C_2, C_1 + (F - C_3)^* (C_2 - C_1)/(C_4 - C_3))) \qquad \text{(Eq. 3)}$$

where δ is the orientation adjustment reference signal 524 expressed in degrees, F is the flux magnitude 532 expressed in a per unit value, and $C_1$, $C_2$, $C_3$, and $C_4$ are constants. As noted, the flux magnitude 532 (i.e., F) can be provided by the flux estimator 534 in a per unit value, and based on the value of the flux magnitude 532, the orientation adjustment reference signal 524 (i.e., δ') can be determined. Constants $C_1$ and $C_2$ can be orientation angles selected in a design phase, and constants $C_3$, and $C_4$ can be per unit values selected in a design phase. FIG. 6 depicts a graph of the relationship between the orientation adjustment reference signal 524 and a flux magnitude 532 using Eq. 3. As shown in FIG. 6, as the air-gap flux varies, the orientation adjustment reference signal can be adjusted based on the air-gap flux magnitude.

Referring again to FIG. 5, orientation adjustment reference signal 524 can be combined with subsynchronous reference angle signal 516 by subsynchronous orientation adder 518 to generate output orientation signal 526. Output orientation signal 526 is used to adjust an orientation of an output phasor generated by output transform module 508. Output transform module 508 transforms current sub synchronous damping transform signal 522 to a phasor-based reference frame, in a substantially inverse manner as is performed by input transform module 504. As such, an inverse of Eq. 1 is performed on an α component of subsynchronous damping transform signal 522, and an inverse of Eq. 2 is performed on a β component of subsynchronous damping transform signal 522. Output transform module 508 outputs a resulting damping control phasor 434 as shown in FIG. 4. Damping control phasor 434 includes a frequency component that is substantially equal to a difference between the frequency of electric power transmission and distribution grid 213 and the subsynchronous current frequency.

Figure 7:
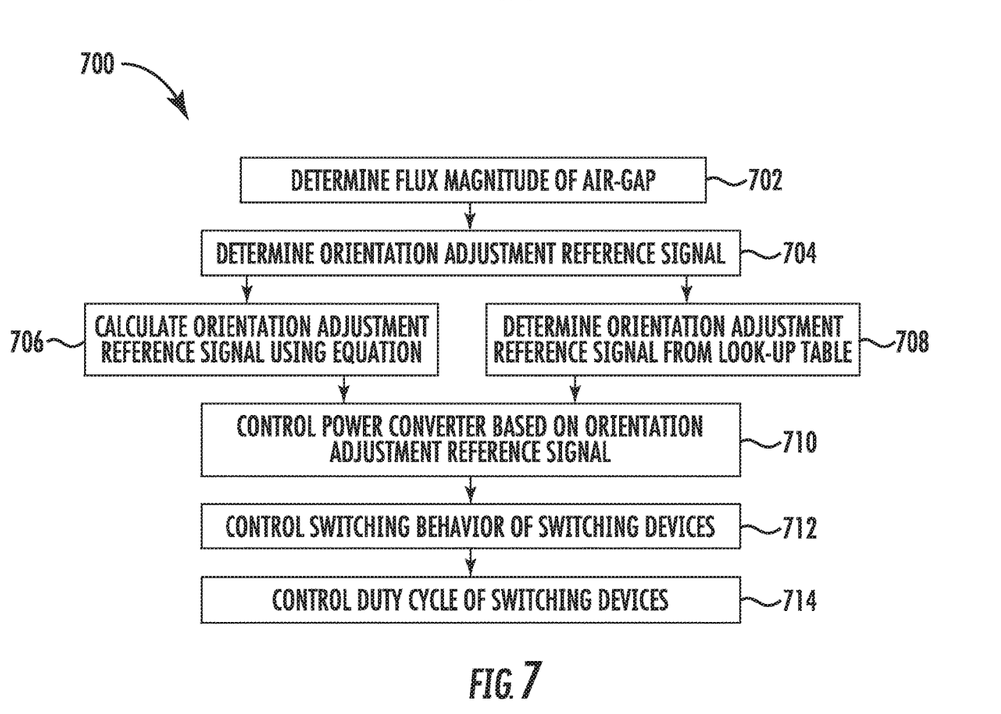
FIG. 7 depicts a flow diagram of a method according to example aspects of the present disclosure.

Referring now to FIG. 7, a flow diagram of an example method (700) for controlling a power converter according to an example embodiment of the present disclosure is depicted. The power converter can be a power converter in a wind turbine system, which can also include a generator with a rotor and a stator. The method 700 can be implemented by a control device or control system, such as an electrical and control system 200 or a turbine controller 202 depicted in FIG. 2, or a control device 1010 depicted in FIG. 9. In addition, FIG. 7 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (702), a method (700) can include determining a flux magnitude of an air-gap between a rotor and a stator in the generator. For example, a flux estimator 534 can estimate a flux magnitude 532 of an air gap between the rotor and a stator such as, for example, by estimating the flux magnitude based on a voltage of the stator. The flux estimator 532 can be a flux estimator as is known in the art or any suitable device or method to determine a flux magnitude.

At (704), the method (700) can include determining an orientation adjustment reference signal for the current damping module based at least in part on the flux magnitude. For example, a flux magnitude 532 can be provided to an adaptive orientation angle adjustment logic 530 in a current damping module 410. The adaptive orientation angle adjustment logic 530 can determine an orientation adjustment reference signal 524 for the current damping module 410 based at least in part on the flux magnitude 532. For example, at (706) the orientation adjustment reference signal 524 can be determined using an equation, such as Eq. 3 as discussed herein. Alternatively, at (708), the orientation adjustment reference signal 524 can be determined from a look-up table. For example, a control device 1000 can reference a lookup table and select an orientation adjustment reference signal 524 corresponding to the value of a flux magnitude 532.

At (710), the method (700) can include controlling the power converter based at least in part on the orientation adjustment reference signal. For example, a power converter system 300 can include a rotor converter switching array 336 and a line converter switching array 338, each of which can include a plurality of switching devices. A rotor converter control module 314 can be coupled to the rotor converter switching array 336 and a line converter control module 330 can be coupled to the line converter switching array 338. The rotor converter control module 314 can be controlled based at least in part on the orientation adjustment reference signal 524 as described herein. At (712), the method (700) can include controlling a switching behavior of the plurality of switching devices. For example, the rotor converter control module 314 can control a switching behavior of the rotor converter switching array 336, and a line converter switch control signal 342 can control a switching behavior of a line converter switching array 338. Further, at (714), the method (700) can include controlling a duty cycle of the plurality of switching devices. For example, a rotor converter control module 314 can use pulse-width modulation to control a duty cycle of a rotor converter switch control signal 340. The rotor converter switch control signal 340 can control a switching behavior of the plurality of switching devices in the rotor converter switching array 336. In this way, the power converter can be controlled based at least in part on the orientation adjustment reference signal 524, and further, a switching behavior of the plurality of switching devices can be controlled, such as by controlling a duty cycle of the plurality of switching devices.

Figure 8:
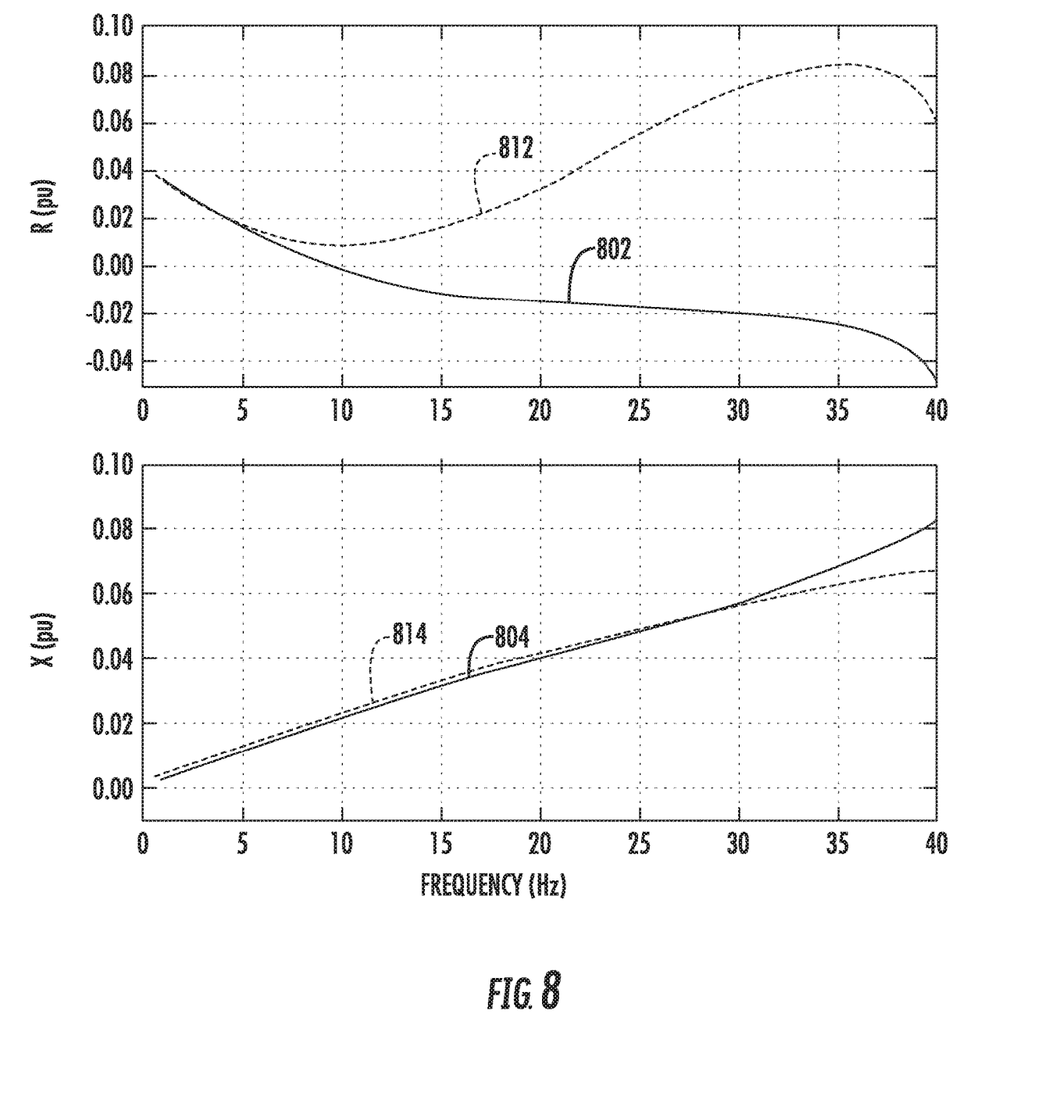
FIG. 8 depicts an example graph of a simulation showing the resistance and reactance in a subsynchronous frequency range with and without implementing example aspects of the present disclosure.

Referring now to FIG. 8, an example simulation depicting the problem addressed by example aspects of the present disclosure is shown. FIG. 8 depicts a per unit resistance 802 and a per unit reactance 804 for a subsynchronous frequency range for the wind turbine system with a power converter that is not controlled based on an adaptive orientation angle adjustment logic according to example aspects of the present disclosure. Similarly, a per unit resistance 812 and per unit reactance 814 for a subsynchronous frequency range for the wind turbine system with a power converter that is controlled based on an adaptive orientation angle adjustment logic according to example aspects of the present disclosure is also depicted.

As shown, the resistance 802 becomes negative for a portion of the sub synchronous frequency range. For example, the per unit resistance 802 dips below zero resistance for a portion of the subsynchronous frequency range. In such a situation, the wind turbine generator may exhibit SSCI instability. However, by using example aspects of the present disclosure, the resistance 812 can remain positive for the subsynchronous frequency range such that the wind turbine system exhibits a positive damping characteristic for the subsynchronous frequency range. For example, the resistance can remain between 0 and 1 in a per unit value for the sub synchronous frequency range. In this way, the wind turbine system according to example aspects of the present disclosure can exhibit a positive damping characteristic for the subsynchronous frequency range. The subsynchronous frequency range can be, for example, a frequency range that is less than a frequency of an electric power transmission and distribution grid (e.g., 50/60 Hz).

Figure 9:
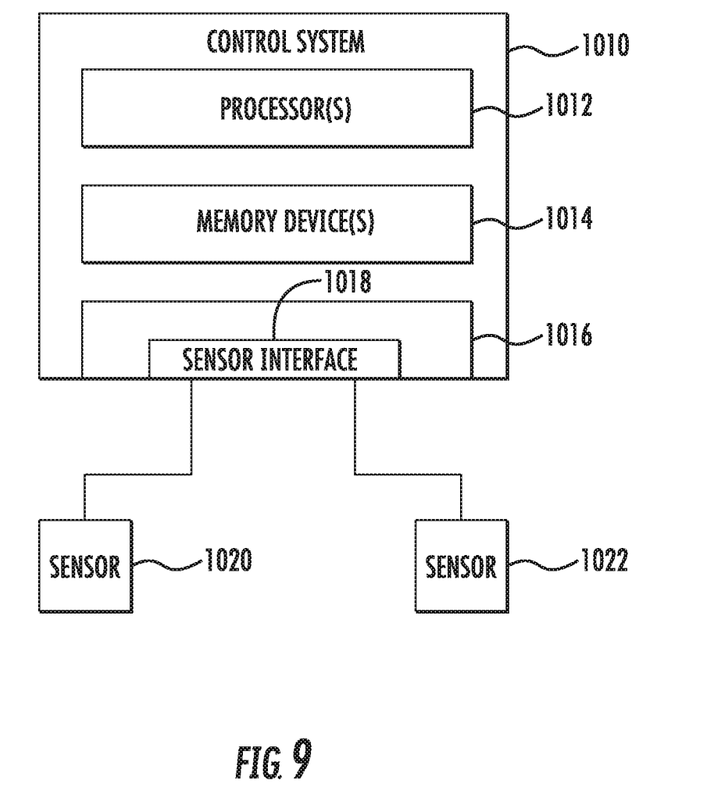
FIG. 9 depicts an example control device according to example aspects of the present disclosure.

Referring now to FIG. 9, an example control device/system 1010 according to example embodiments of the present disclosure is depicted. The control device/system 1010 can be used, for example, as an electrical and control system 200 or a turbine controller 202 as shown in FIG. 2 and/or to implement any of the regulators or modules described herein. In some embodiments, the control device/system 1010 can include one or more processor(s) 1012 and one or more memory device(s) 1014. The processor(s) 1012 and memory device(s) 1014 can be distributed so that they are located at one more locales or with different devices.

The processor(s) 1012 and memory device(s) 1014 can be configured to perform a variety of computer-implemented functions and/or instructions (e.g., performing the methods, steps, calculations and the like and storing relevant data as disclosed herein). The instructions when executed by the processor(s) 1012 can cause the processor(s) 1012 to perform operations according to example aspects of the present disclosure. For instance, the instructions when executed by the processor(s) 1012 can cause the processor(s) 1012 to implement the method of FIGS. 7 (700) discussed herein.

Additionally, the control device 1010 can include a communication interface 1016 to facilitate communications between the control device 1010 and various components of a wind turbine system, wind farm, or power system, including power parameters, current parameters, voltage parameters, or other parameters described herein. Further, the communication interface 1018 can include a sensor interface 1018 (e.g., one or more analog-to-digital converters) to permit signals transmitted from one or more sensors 1020, 1022 to be converted into signals that can be understood and processed by the processor(s) 1012. It should be appreciated that the sensors (e.g. sensors 1020, 1022) can be communicatively coupled to the communications interface 1018 using any suitable means, such as a wired or wireless connection. The signals can be communicated using any suitable communications protocol. The sensors (1020, 1022) can be, for example, voltage sensors, current sensors, power sensors, or any other sensor device described herein.

As such, the processor(s) 1012 can be configured to receive one or more signals from the sensors 1020 and 1022. For instance, in some embodiments, the processor(s) 1012 can receive signals indicative of a current from the sensor 1020. In some embodiments, the processor(s) 1012 can receive signals indicative of voltage (e.g. stator voltage) from sensor 1022.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 1014 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 1014 can generally be configured to store suitable computer-readable instructions that, when implemented by the processor(s) 1012, configure the control device 1010 to perform the various functions as described herein.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a power converter in a wind turbine system, the wind turbine system comprising a generator and a power converter, the power converter comprising a plurality of switching devices and a current damping module, the method comprising: determining, by one or more computing devices, a flux magnitude of an air-gap between a rotor and a stator in the generator, wherein determining the flux magnitude of the air-gap comprises estimating the flux magnitude with a flux magnitude estimator; determining, by the one or more computing devices, an orientation adjustment reference signal for the current damping module by an equation, the equation including selecting a minimum of a first threshold or a second threshold, the second threshold being determined based on the flux magnitude; and controlling, by the one or more computing devices, the power converter based at least in part on the orientation adjustment reference signal.

2. The method of claim 1, wherein the power converter is controlled such that the wind turbine system exhibits a positive damping characteristic for a subsynchronous frequency range.

3. The method of claim 2, wherein the wind turbine system is coupled to an electric power transmission and distribution grid; and
wherein the subsynchronous frequency range comprises a frequency range that is less than a frequency of the electric power transmission and distribution grid.

4. The method of claim 1, wherein the estimated flux magnitude is based at least in part on a voltage of the stator.

5. The method of claim 1, wherein determining, by the one or more computing devices, the orientation adjustment reference signal for the current damping module comprises:
determining, by the one or more computing devices, the orientation adjustment reference signal from a look-up table.

6. The method of claim 1, wherein controlling, by the one or more computing devices, the power converter based at least in part on the orientation adjustment reference signal comprises:
controlling, by the one or more computing devices, a switching behavior of the plurality of switching devices.

7. The method of claim 6, wherein controlling, by the one or more computing devices, the switching behavior of the plurality of switching devices comprises:
controlling, by the one or more computing devices, a duty cycle of the plurality of switching devices.

8. A control system for a wind turbine system, the wind turbine system comprising a generator and a power converter, the power converter comprising a plurality of switching devices and a current damping module, the control system comprising:
one or more processors and one or more memory devices configured to store instructions that when executed by the one or more processors cause the one or more processors to perform operations, the operations comprising:
determining a flux magnitude of an air-gap between a rotor and a stator in the generator, wherein determining the flux magnitude of the air-gap comprises estimating the flux magnitude with a flux magnitude estimator;
determining an orientation adjustment reference signal for the current damping module based at least in part on the determined flux magnitude; and
controlling a duty cycle of the plurality of switching devices so as to control the power converter based at least in part on the orientation adjustment reference signal;
wherein the power converter is controlled such that the wind turbine system exhibits a positive damping characteristic for a subsynchronous frequency range.

9. The control system of claim 8, wherein the wind turbine system is coupled to an electric power transmission and distribution grid; and
wherein the subsynchronous frequency range comprises a frequency range that is less than a frequency of the electric power transmission and distribution grid.

10. The control system of claim 8, wherein determining the orientation adjustment reference signal for the current damping module comprises:
   determining the orientation adjustment reference signal from a look-up table.

11. A doubly fed induction generator (DFIG) wind turbine system, the DFIG wind turbine system being coupled to an electric power transmission and distribution grid comprising:
   a DFIG generator, the DFIG generator comprising a rotor and a stator;
   a power converter, the power converter comprising a plurality of switching devices and a current damping module; and
   a control system, the control system comprising one or more processors and one or more memory devices configured to store instructions that when executed by the one or more processors cause the one or more processors to perform operations, the operations comprising:
      determining a flux magnitude of an air-gap between the rotor and the stator in the DFIG generator, wherein determining the flux magnitude of the air-gap comprises estimating the flux magnitude with a flux magnitude estimator;
      determining an orientation adjustment reference signal for the current damping module based at least in part on the determined flux magnitude; and
      controlling the power converter based at least in part on the orientation adjustment reference signal;
      wherein the power converter is controlled such that the DFIG wind turbine system exhibits a positive damping characteristic for a subsynchronous frequency range comprising a frequency range that is less than a frequency of the electric power transmission and distribution grid.

12. The DFIG wind turbine system of claim 11, wherein determining the orientation adjustment reference signal for the current damping module comprises:
   determining the orientation adjustment reference signal from a look-up table.

13. The DFIG wind turbine system of claim 11, wherein controlling the power converter based at least in part on the orientation adjustment reference signal comprises:
   controlling a switching behavior of the plurality of switching devices.

* * * * *